US008589620B2

(12) United States Patent
Tan et al.

(10) Patent No.: US 8,589,620 B2
(45) Date of Patent: Nov. 19, 2013

(54) DATA WRITING METHOD, MEMORY CONTROLLER, AND MEMORY STORAGE APPARATUS

(75) Inventors: Kheng-Chong Tan, Miaoli (TW); Lai-Hock Chua, Hsinchu (TW)

(73) Assignee: Phison Electronics Corp., Miaoli (TW)

( * ) Notice: Subject to any disclaimer, the term of this patent is extended or adjusted under 35 U.S.C. 154(b) by 297 days.

(21) Appl. No.: 13/077,983

(22) Filed: Apr. 1, 2011

(65) Prior Publication Data

US 2012/0166740 A1    Jun. 28, 2012

(30) Foreign Application Priority Data

Dec. 24, 2010    (TW) .............................. 99145890 A

(51) Int. Cl.
*G06F 12/02*    (2006.01)
(52) U.S. Cl.
USPC ........................................ 711/103; 711/209
(58) Field of Classification Search
None
See application file for complete search history.

(56) References Cited

U.S. PATENT DOCUMENTS

| 7,315,917 | B2* | 1/2008 | Bennett et al. | 711/103 |
| 8,095,723 | B2* | 1/2012 | Kim et al. | 711/103 |
| 8,375,162 | B2* | 2/2013 | Allen et al. | 711/103 |
| 2010/0257307 | A1* | 10/2010 | Chu et al. | 711/103 |

* cited by examiner

*Primary Examiner* — Gary Portka
(74) *Attorney, Agent, or Firm* — Jianq Chyun IP Office

(57) ABSTRACT

A data writing method for a rewritable non-volatile memory module is provided. The method includes receiving at least one update data, wherein the update data belongs to at least one logical page of a first logical block, and the first logical block is mapped to a first physical block. The method also includes when a physical page of a second physical block that is corresponding to the logical page already stores data, selecting a third physical block from a free area, writing the update data into the third physical block, serving the third physical block as the child physical block of the first physical block, and executing an erasing operation on the second physical block, wherein the second physical block is currently a child physical block of the first physical block. Thereby, the method can effectively reduce the number of operations for merging data and increase the data writing speed.

21 Claims, 12 Drawing Sheets

DATA WRITING METHOD, MEMORY CONTROLLER, AND MEMORY STORAGE APPARATUS

CROSS-REFERENCE TO RELATED APPLICATION

This application claims the priority benefit of Taiwan application serial no. 99145890, filed on Dec. 24, 2010. The entirety of the above-mentioned patent application is hereby incorporated by reference herein and made a part of this specification.

BACKGROUND

1. Technology Field

The invention generally relates to a data writing method, and more particularly, to a data writing method for writing update data into a non-volatile memory module, and a memory controller and a memory storage apparatus using the same.

2. Description of Related Art

In recently years, the consumers' demand to storage media for storing digital contents has increased drastically along with the widespread of digital cameras, cell phones, and MP3. Flash memory is one of the most adaptable storage media to be carried around and used for storing digital files due to its characteristics such as data non-volatility, low power consumption, small volume, and non-mechanical structure.

Based on the physical characteristics of flash memory, memory cells of a flash memory can only be programmed in a signal direction (i.e., each bit in the memory cells can only be programmed from 1 to 0). Thus, while writing data into the memory cells of a flash memory, data previously stored in the memory cells has to be erased before the new data is written.

Regarding the design of a flash memory storage system, the physical blocks in a flash memory of the flash memory storage system are usually grouped into a plurality of physical blocks. Each of the physical blocks has at least one flash memory cell. Each of the flash memory cells is composed of at least one transistor, such as a MOSFET or any other transistor or logic circuit. Each of the flash memory cells may store at least one bit. The physical blocks are grouped into a data area and a free area. The physical blocks in the data area have stored data, and the physical blocks in the free area are used for substituting the physical blocks in the data area when the write commands are executed. In order to allow a host to successfully access the physical blocks which are alternatively used for storing data, the flash memory storage system provides logical blocks to map to the physical blocks. To be specific, the flash memory storage system converts a logical access address to be accessed by the host into a corresponding logical block and records the mapping relationship between the logical blocks and the physical blocks in the data area in a logical block-physical block mapping table for reflecting the alternation of the physical blocks. Thus, the host accesses data simply according to the logical access address, while the flash memory storage system actually reads data from or writes data into the corresponding physical block according to the logical block-physical block mapping table.

To be specific, when the host is about to store data into a logical block, the flash memory storage system selects a physical block from the free area and writes the new data into the physical block (also referred to as a child physical block) selected from the free area to substitute the physical block (also referred to as a mother physical block) originally mapped to the logical block. Subsequently, at the right time, the flash memory storage system executes a data merging procedure to merge the valid data in the mother physical block and the child physical block (i.e., merges the data belonging to the logical block into the same physical block). For example, the flash memory storage system copies valid data in the mother physical block to the child physical block, re-maps the logical block to the child physical block (i.e., associates the child physical block to the data area), and erases the original mother physical block in the data area and associates it with the free area.

Based on the operational architecture of the flash memory storage system described above, when the host repeatedly updates data in the same logical page of the same logical block, the flash memory storage system has to execute the data merging and data erasing operations repeatedly. Thereby, the time for executing write commands will be prolonged, and the performance of the flash memory storage system will be reduced.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

Accordingly, the invention is directed to a data writing method, a memory controller, and a memory storage system, wherein the time for executing a write command is effectively shortened and accordingly the data writing speed is effectively improved.

The invention provides a data writing method for writing data into a rewritable non-volatile memory module. The rewritable non-volatile memory module has a plurality of physical blocks, and each of the physical blocks has a plurality of sequentially arranged physical pages. The data writing method includes grouping the physical blocks into at least a data area and a free area and configuring a plurality of logical blocks for mapping to the physical blocks of the data area, wherein each of the logical blocks has a plurality of logical pages. The data writing method also includes receiving a plurality of update data, wherein the update data belongs to a plurality of continuous logical pages among the logical pages, the continuous logical pages belong to a first logical block, and the first logical block is mapped to a first physical block. The data writing method further includes determining whether any one of the physical blocks in the free area is selected to serve as a child physical block corresponding to the first physical block. The data writing method still includes when a second physical block in the free area is selected to serve as the child physical block corresponding to the first physical block, determining whether at least a portion of the physical pages of the second physical block that are corresponding to the continuous logical pages already store data. The data writing method further includes executing a second writing procedure when at least a portion of the physical pages of the second physical block that are corresponding to the continuous logical pages already store data. Herein the second writing procedure includes identifying data stored in the second physical block as first data and second data; selecting a third physical block from the free area; writing the update data and the second data into the third physical block; serving the third physical block as the child physical block corresponding to the first physical block; and executing an erasing operation on the second physical block. Herein the first data is data stored in the physical pages of the second physical block that are corresponding to the continuous logical pages, and the second data is data stored in the physical pages of the second physical block that are not corresponding to the continuous logical pages.

The invention provides a data writing method for writing a plurality of update data into a rewritable non-volatile memory module. The rewritable non-volatile memory module has a plurality of physical blocks, each of the physical blocks has a plurality of sequentially arranged physical pages, and the physical blocks are grouped into a data area and a free area. A plurality of logical blocks is configured for mapping to the physical blocks of the data area, and each of the logical blocks is mapped to one of the physical blocks in the data area and has a plurality of logical pages. A fifth physical block among the physical blocks of the data area is mapped to a first logical block among the logical blocks, a sixth physical block among the physical blocks of the free area is selected to serve as a child physical block corresponding to the fifth physical block, wherein the update data belongs to a plurality of continuous logical pages among the logical pages of the first logical block, and at least a portion of the physical pages of the sixth physical block that are corresponding to the continuous logical pages already store data. The data writing method includes determining whether physical pages corresponding to the continuous logical pages in the sixth physical block belong to a predetermined page area. The data writing method also includes executing a second writing procedure when the physical pages corresponding to the continuous logical pages in the sixth physical block that are belong to the predetermined page area. Herein the second writing procedure includes identifying data stored in the sixth physical block as first data and second data; selecting a seventh physical block from the physical blocks of the free area; writing the update data and the second data into the seventh physical block; serving the seventh physical block as the child physical block corresponding to the fifth physical block; and executing an erasing operation on the sixth physical block. Herein the first data is data stored in the physical pages of the sixth physical block that are corresponding to the continuous logical pages, and the second data is data stored in the physical pages of the sixth physical block that are not corresponding to the continuous logical pages. In addition, the predetermined page area is a plurality of continuous physical pages containing a start physical page in each of the physical blocks.

The invention provides a data writing method for writing data into a rewritable non-volatile memory module. The rewritable non-volatile memory module has a plurality of physical blocks, and each of the physical blocks has a plurality of sequentially arranged physical pages. The data writing method includes grouping the physical blocks into at least a data area and a free area and configuring a plurality of logical blocks for mapping to the physical blocks of the data area, wherein each of the logical blocks has a plurality of logical pages. The data writing method also includes receiving at least one update data, wherein the update data is corresponding to at least one of the logical pages, the logical page belongs to a first logical block among the logical blocks, and the first logical block is mapped to a first physical block among the physical blocks. The data writing method further includes determining whether any one of the physical blocks in the free area is selected to serve as a child physical block corresponding to the first physical block. The data writing method still includes when a second physical block among the physical blocks of the free area is selected to serve as the child physical block corresponding to the first physical block, determining whether a physical page corresponding to the logical page in the second physical block already stores data and executing a second writing procedure when the physical page corresponding to the logical page in the second physical block already stores data. Herein the second writing procedure includes selecting a third physical block from the physical blocks of the free area; writing the update data into the third physical block; serving the third physical block as the child physical block corresponding to the first physical block; and executing an erasing operation on the second physical block.

According to an exemplary embodiment of the invention, a memory controller for managing a rewritable non-volatile memory module is provided, wherein the rewritable non-volatile memory module has a plurality of physical blocks. The memory controller includes a host interface, a memory interface, and a memory management circuit. The host interface is configured for coupling to a host system, and the memory interface is configured for coupling to the rewritable non-volatile memory module. The memory management circuit is coupled to the host interface and the memory interface and is configured for executing the data writing method described above.

According to an exemplary embodiment of the invention, a memory storage apparatus including a connector, a rewritable non-volatile memory module, and a memory controller is provided. The rewritable non-volatile memory module has a plurality of physical blocks. The memory controller is coupled to the rewritable non-volatile memory module and the connector and is configured for executing the data writing method described above.

It should be understood, however, that this Summary may not store all of the aspects and embodiments of the present invention, is not meant to be limiting or restrictive in any manner, and that the invention as disclosed herein is and will be understood by those of ordinary skill in the art to encompass obvious improvements and modifications thereto.

As described above, exemplary embodiments of the invention provide a data writing method, a memory controller, and a memory storage apparatus, wherein the number of operations for merging data is reduced and accordingly the time for executing write commands is effectively shortened.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
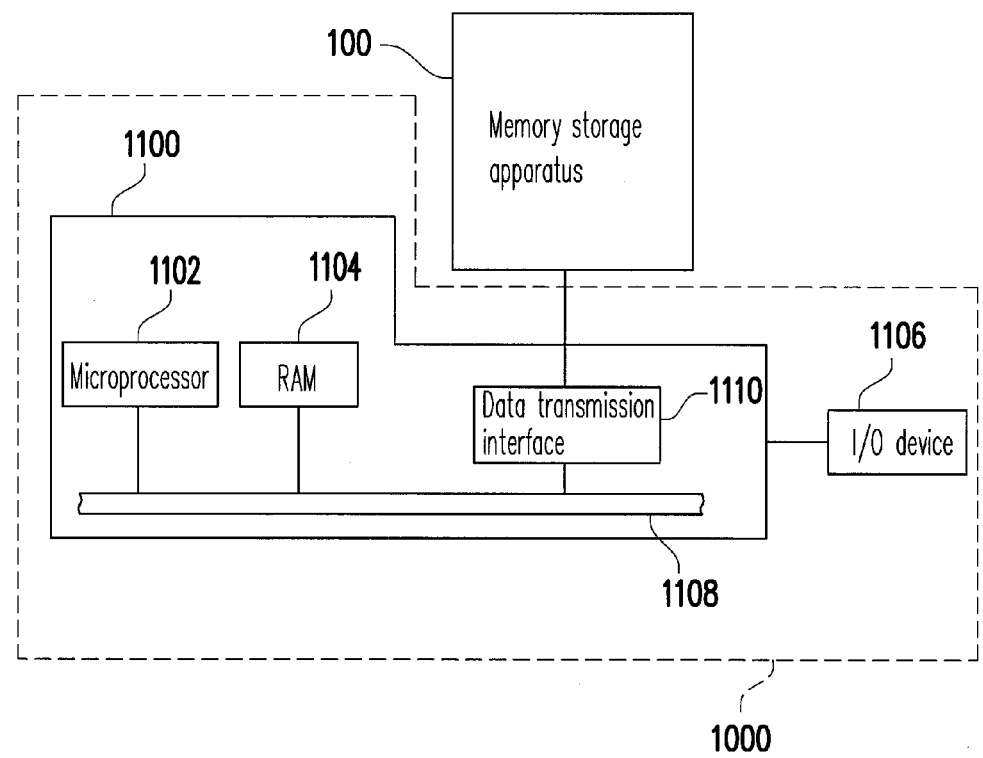
FIG. 1A illustrates a host system and a memory storage apparatus according to a first exemplary embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

First Exemplary Embodiment

FIG. 1A illustrates a host system and a memory storage apparatus according to the first exemplary embodiment of the invention.

Figure 1B:
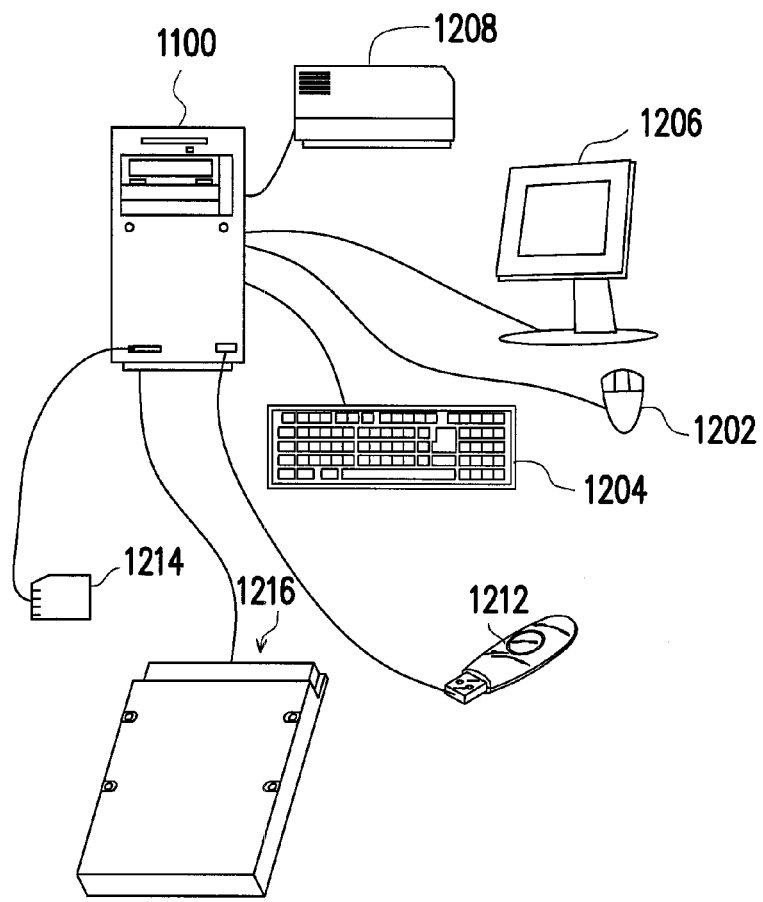
FIG. 1B is a diagram illustrating a computer, input/output (I/O) devices, and a memory storage apparatus according to an exemplary embodiment of the invention.

Referring to FIG. 1A, the host system 1000 includes a computer 1100 and an input/output (I/O) device 1106. The computer 1100 includes a microprocessor 1102, a random access memory (RAM) 1104, a system bus 1108, and a data transmission interface 1110. The I/O device 1106 includes a mouse 1202, a keyboard 1204, a display 1206, and a printer 1208, as shown in FIG. 1B. It should be understood that the I/O device 1106 is not limited to the devices illustrated in FIG. 1B, and which may further include other devices.

Figure 1C:
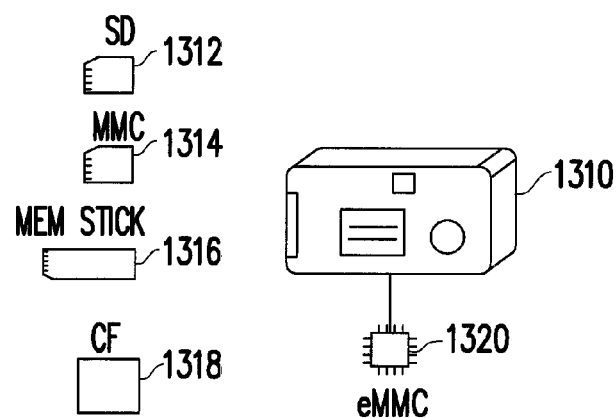
FIG. 1C is a diagram of a host system and a memory storage apparatus according to another exemplary embodiment of the invention.

In an embodiment of the invention, the memory storage apparatus 100 is coupled to other components of the host system 1000 through the data transmission interface 1110. Data can be written into or read from the memory storage apparatus 100 through the operations of the microprocessor 1102, the RAM 1104, and the I/O device 1106. The memory storage apparatus 100 is a non-volatile memory storage apparatus, such as the flash drive 1212, the memory card 1214, or the solid state drive (SSD) 1216 illustrated in FIG. 1B Generally speaking, the host system 1000 may be substantially any system that can store data. Even though the host system 1000 is described as a computer system in the present exemplary embodiment, in another exemplary embodiment of the invention, the host system 1000 may also be a digital camera, a video camera, a communication device, an audio player, or a video player. For example, if the host system is a digital camera (video camera) 1310, the non-volatile memory storage apparatus is a secure digital (SD) card 1312, a multi media card (MMC) 1314, a memory stick (MS) 1316, a compact flash (CF) card 1318, or an embedded storage device 1320 used by the digital camera (video camera) 1310 (as shown in FIG. 1C). The embedded storage device 1320 includes an embedded MMC (eMMC). It should be mentioned that an eMMC is directly coupled to a substrate of the host system.

Figure 2:
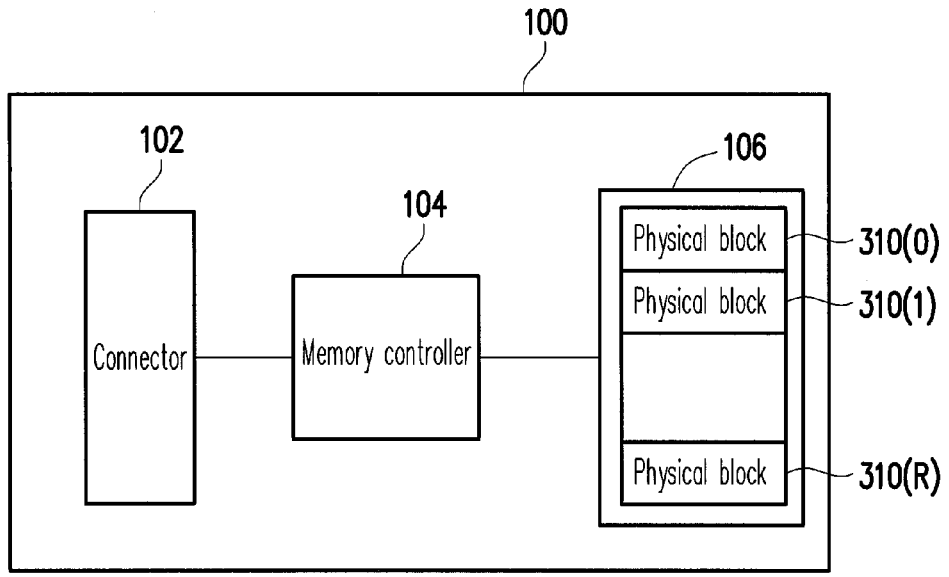
FIG. 2 is a schematic block diagram of the memory storage apparatus in FIG. 1A.

FIG. 2 is a schematic block diagram of the memory storage apparatus in FIG. 1A.

Referring to FIG. 2, the memory storage apparatus 100 includes a connector 102, a memory controller 104, and a rewritable non-volatile memory module 106.

In the present exemplary embodiment, the connector 102 is a SD connector. However, the invention is not limited thereto, and the connector 102 may also be a universal serial bus (USB) connector, an Institute of Electrical and Electronic Engineers (IEEE) 1394 connector, a peripheral component interconnect (PCI) express connector, a serial advanced technology attachment (SATA) connector, a MS connector, a MMC connector, a CF connector, an integrated device electronics (IDE) connector, or any other suitable connector.

The memory controller 104 executes a plurality of logic gates or control instructions implemented in a hardware or firmware form and performs various data operations on the rewritable non-volatile memory module 106 according to instructions of the host system 1000. In particular, the memory controller 104 writes data through the data writing method in the present exemplary embodiment.

The rewritable non-volatile memory module 106 is coupled to the memory controller 104 for storing data written by the host system 1000.

The rewritable non-volatile memory module 106 has physical blocks 310(0)-310(R). Each of the physical blocks has a plurality of physical pages, wherein the physical pages of the same physical block can be individually written but have to be erased all together. Each physical block may be composed of 128 physical pages. However, the invention is not limited thereto, and each physical block may also be composed of 64, 256, or any other number of physical pages.

To be specific, physical block is the smallest unit for erasing data. Namely, each physical block contains the least number of memory cells that are erased together. Physical page is the smallest programming unit. Namely, physical page is the smallest unit for writing data. However, in another exemplary embodiment of the invention, the smallest unit for writing data may also be sector or other unit. Each physical page usually contains a data bit area D and a redundancy bit area R. The data bit area D is used for storing user data, and the redundancy bit area R is used for storing system data (for example, error checking and correcting (ECC) codes).

In the present exemplary embodiment, the rewritable non-volatile memory module 106 is a multi level cell (MLC) NAND flash memory module. However, the invention is not limited thereto, and the rewritable non-volatile memory module 106 may also be a single level cell (SLC) NAND flash memory module, any other flash memory module, or any memory module having the same characteristics.

Figure 3:
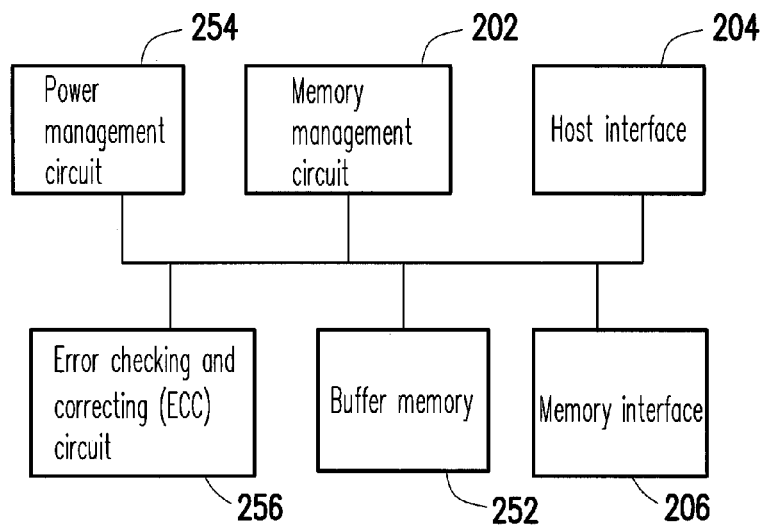
FIG. 3 is a schematic block diagram of a memory controller according to the first exemplary embodiment of the invention.

FIG. 3 is a schematic block diagram of a memory controller according to the first exemplary embodiment of the invention.

Referring to FIG. 3, the memory controller 104 includes a memory management circuit 202, a host interface 204, and a memory interface 206.

The memory management circuit 202 controls the overall operation of the memory controller 104. To be specific, the memory management circuit 202 has a plurality of control instructions. When the memory storage apparatus 100 is in operation, the control instructions are executed to perform various data operations on the rewritable non-volatile memory module 106. In particular, the memory management circuit 202 writes data into the rewritable non-volatile memory module 106 through the data writing method in the present exemplary embodiment.

In the present exemplary embodiment, the control instructions of the memory management circuit 202 are implemented in a firmware form. For example, the memory management circuit 202 has a microprocessor unit (not shown) and a read-only memory (ROM, not shown), and the control instructions are burnt into the ROM. When the memory storage apparatus 100 is in operation, the control instructions are executed by the microprocessor unit to accomplish various data operations.

In another exemplary embodiment of the invention, the control instructions of the memory management circuit 202 are stored into a specific area of the rewritable non-volatile memory module 106 (for example, a system area exclusively used for storing system data in the rewritable non-volatile memory module 106) as program codes. Besides, the memory management circuit 202 has a microprocessor unit (not shown), a ROM (not shown), and a RAM (not shown). In particular, the ROM has driver codes, and when the memory controller 104 is enabled, the microprocessor unit first executes the driver codes to load the control instructions from the rewritable non-volatile memory module 106 into the RAM of the memory management circuit 202. Then, the microprocessor unit runs these control instructions to perform various data operations. Additionally, in yet another exemplary embodiment of the invention, the control instructions of the memory management circuit 202 may also be implemented in a hardware form.

The host interface 204 is coupled to the memory management circuit 202 and configured to receive and identify commands and data from the host system 1000. Namely, commands and data from the host system 1000 are transmitted to the memory management circuit 202 through the host interface 204. In the present exemplary embodiment, the host interface 204 is, corresponding to the connector 102, a SD interface. However, the invention is not limited thereto, and the host interface 204 may also be a USB interface, a PATA interface, an IEEE 1394 interface, a PCI express interface, a SATA interface, a MS interface, a MMC interface, a CF interface, an IDE interface, or any other suitable data transmission interface.

The memory interface 206 is coupled to the memory management circuit 202 and configured to access the rewritable non-volatile memory module 106. Namely, data to be written into the rewritable non-volatile memory module 106 is converted by the memory interface 206 into a format acceptable to the rewritable non-volatile memory module 106.

In an exemplary embodiment of the invention, the memory controller 104 further includes a buffer memory 252. The buffer memory 252 is coupled to the memory management circuit 202 and configured to temporarily store data and commands from the host system 1000 or data from the rewritable non-volatile memory module 106.

In an exemplary embodiment of the invention, the memory controller 104 further includes a power management circuit 254. The power management circuit 254 is coupled to the memory management circuit 202 and configured to control the power supply of the memory storage apparatus 100.

In an exemplary embodiment of the invention, the memory controller 104 further includes an error checking and correcting (ECC) circuit 256. The ECC circuit 256 is coupled to the memory management circuit 202 and configured to execute an ECC procedure in order to ensure data accuracy. To be specific, when the memory management circuit 202 receives a write command from the host system 1000, the ECC circuit 256 generates a corresponding ECC code for the data corresponding to the write command, and the memory management circuit 202 writes the data corresponding to the write command and the corresponding ECC code into the rewritable non-volatile memory module 106. Subsequently, when the memory management circuit 202 reads the data from the rewritable non-volatile memory module 106, it also reads the ECC code corresponding to the data, and the ECC circuit 256 executes the ECC procedure on the data according to the ECC code.

Figure 4:
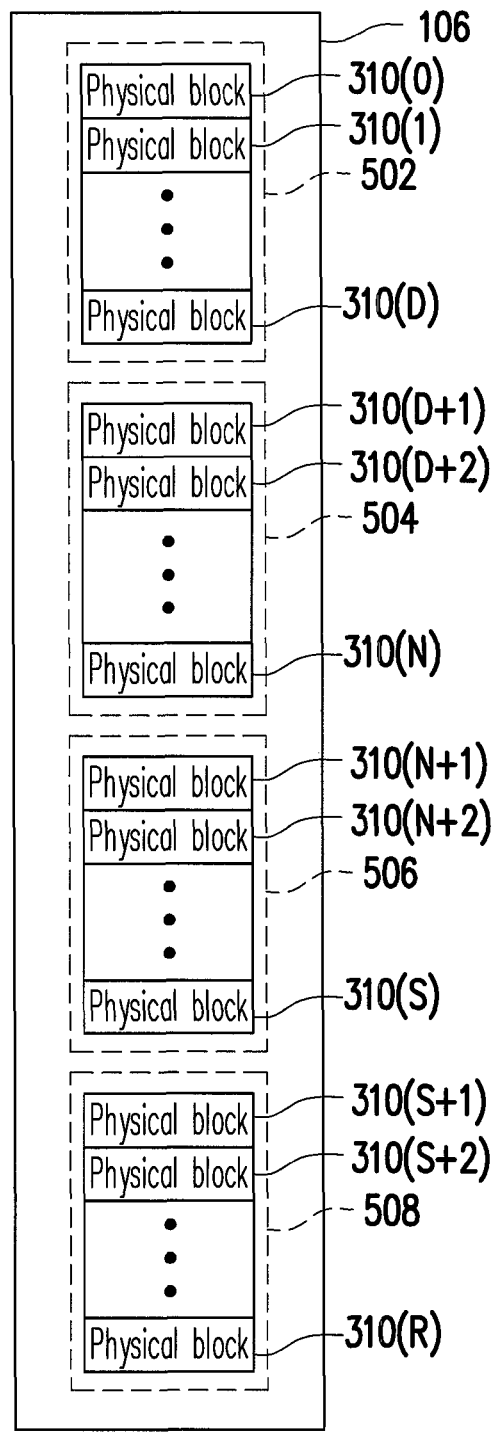
FIG. 4 and FIG. 5 are diagrams of managing physical blocks according to the first exemplary embodiment of the invention.
Figure 5:
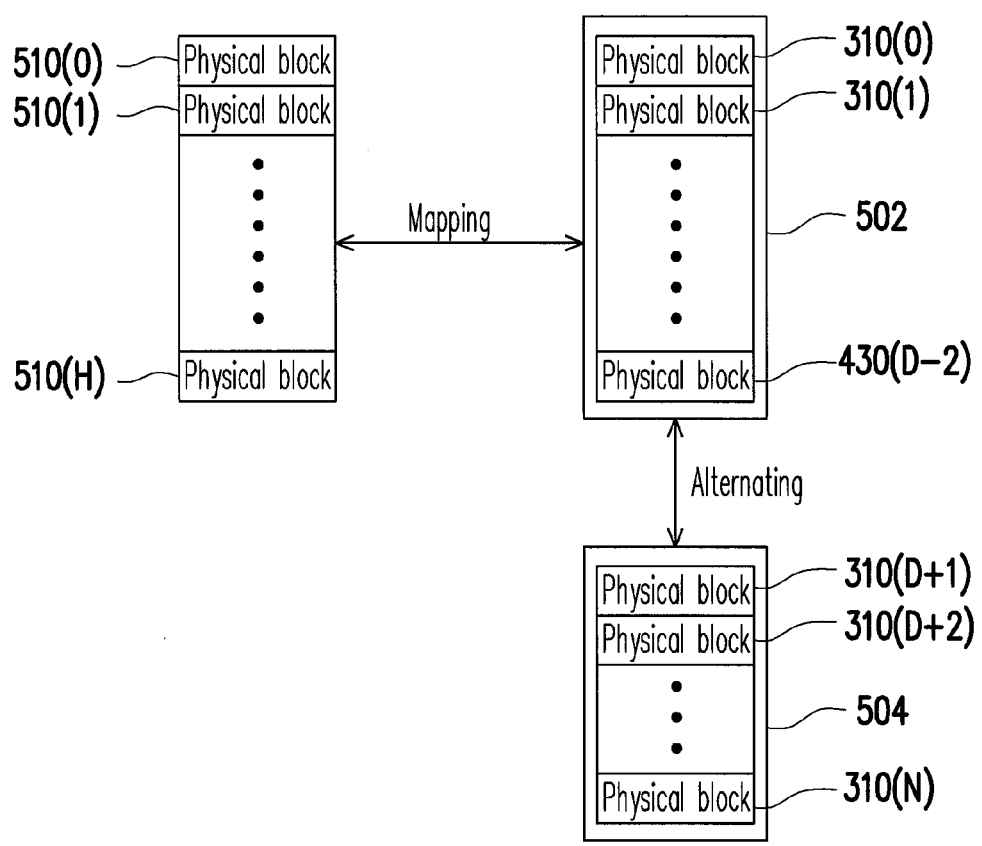

FIG. 4 and FIG. 5 are diagrams of managing physical blocks according to the first exemplary embodiment of the invention.

Referring to FIG. 4, the memory management circuit 202 of the memory controller 104 logically groups the physical blocks 310(0)-310(R) into a data area 502, a free area 504, a system area 506, and a replacement area 508.

The physical blocks logically belonging to the data area 502 and the free area 504 are used for storing data from the host system 1000. To be specific, the physical blocks in the data area 502 already store data, and the physical blocks in the free area 504 are used for substituting the physical blocks in the data area 502. Thus, the physical blocks in the free area 504 are either blank or available physical blocks (i.e., no data is recorded therein or data recorded therein is marked as invalid data). Namely, the physical blocks in the free area 504 are already erased, or when a physical block in the free area 504 is selected and used for storing data, the selected physical block is erased before it is used for storing the data. Accordingly, the physical blocks in the free area 504 are available physical blocks.

The physical blocks logically belonging to the system area 506 are used for recording system data, such as the manufacturer and model of the rewritable non-volatile memory module, the number of physical blocks in the rewritable non-volatile memory module, and the number of physical pages in each physical block.

The physical blocks logically belonging to the replacement area 508 are used for replacing damaged physical blocks. For example, after the rewritable non-volatile memory module 106 is manufactured, 4% of its physical blocks are reserved for replacement purpose. Namely, when the physical blocks in the data area 502, the free area 504, and the system area 506 are damaged, the physical blocks in the replacement area 508 will be used for replacing the damaged physical blocks. Thus, if there are still normal physical blocks in the replacement area 508 and a physical block is damaged, the memory management circuit 202 selects a normal physical block from the replacement area 508 for replacing the damaged physical block. If there is no more normal physical block in the replacement area 508 and a physical block is damaged, the memory management circuit 202 announces that the entire memory storage apparatus 100 is in a write-protect status and cannot be used for writing data anymore.

In particular, the numbers of physical blocks in the data area 502, the free area 504, the system area 506, and the replacement area 508 vary with different memory specifications. In addition, it should be understood that during the operation of the memory storage apparatus 100, the physical blocks associated with the data area 502, the free area 504, the system area 506, and the replacement area 508 are dynamically changed. For example, when a physical block in the free area 504 is damaged and accordingly is replaced by a physical block in the replacement area 508, the physical block originally in the replacement area 508 is associated with the free area 504.

Referring to FIG. 5, as described above, the physical blocks in the data area 502 and the free area 504 are alternatively used for storing data written by the host system 1000. In the present exemplary embodiment, the memory management circuit 202 configures logical blocks 510(0)-510(H) for mapping to foregoing physical blocks that are alternatively used for storing data, and the memory management circuit 202 maps logical pages of the logical blocks 510(0)-510(H) to logical access addresses accessed by the host system 1000 to allow the host system 1000 to access data.

For example, the memory management circuit 202 initially maps the logical blocks 510(0)-510(H) to the physical blocks of the data area 502. To be specific, after the memory storage apparatus 100 is manufactured, the logical blocks 510(0)-510(H) are respectively mapped to the physical blocks 310(0)-310(D) in the data area 502. Namely, one logical block is mapped to one physical block in the data area 502. Herein the memory management circuit 202 establishes a logical block-physical block mapping table to record the mapping relationship between the logical blocks and the physical blocks. Namely, the memory management circuit 202 converts a logical access address to be accessed by the host system 1000 into logical pages of the corresponding logical block and accesses the data in the corresponding physical block based on the logical block-physical block mapping table.

Figure 6:
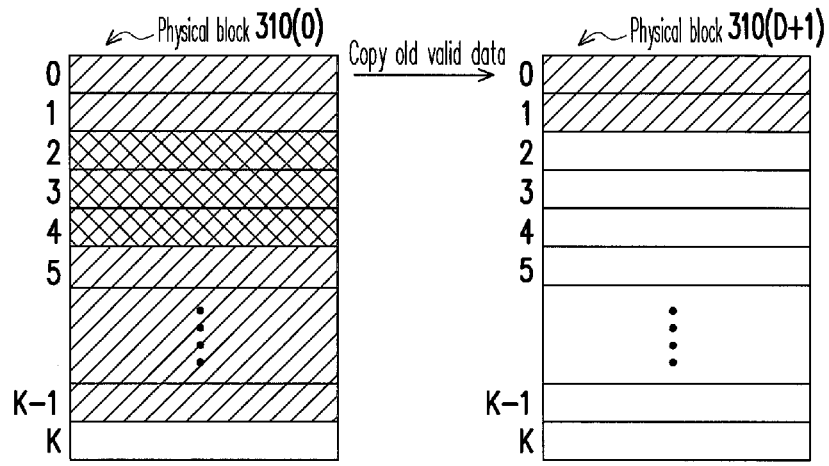
FIGS. 6-8 illustrate an example of writing data into a rewritable non-volatile memory module in a regular sequential writing mode according to the first exemplary embodiment of the invention.
Figure 7:
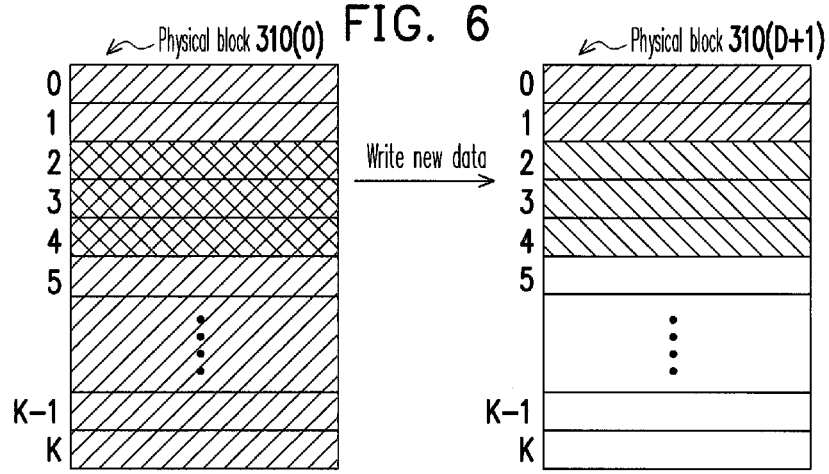
Figure 8:
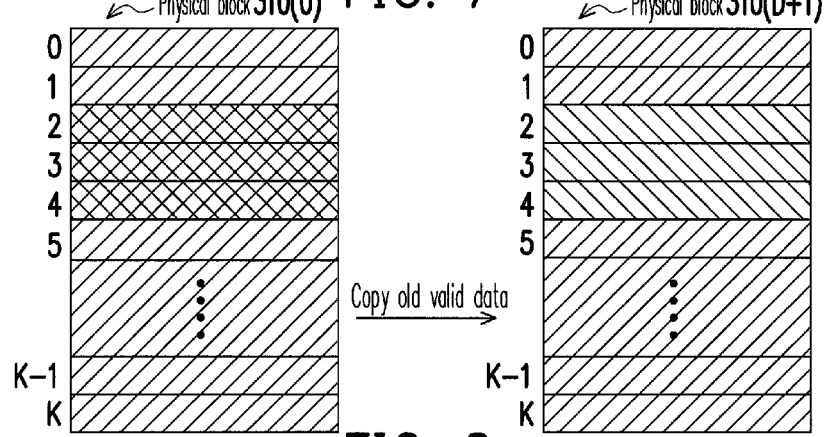

FIGS. 6-8 illustrate an example of writing data into a rewritable non-volatile memory module in a regular sequential writing mode according to the first exemplary embodiment of the invention.

Referring to FIGS. 6-8, assuming that the logical block 510(0) is mapped to the physical block 310(0), when the memory controller 104 receives a write command from the host system 1000 and accordingly is about to write data into a logical page of the logical block 510(0), the memory management circuit 202 identifies that the logical block 510(0) is currently mapped to the physical block 310(0) according to the logical block-physical block mapping table and selects the physical block 310(D+1) from the free area 504 as a substitute physical block for substituting the physical block 310(0). However, when the memory management circuit 202 writes the new data into the child physical block 310(D+1), the memory management circuit 202 does no instantly move all the valid data in the physical block 310(0) to the physical block 310(D+1) to erase the physical block 310(0). To be specific, the memory management circuit 202 copies the valid data before the physical page of the physical block 310(0) for writing data (i.e., data in the $0^{th}$ physical page and the $1^{st}$ physical page of the physical block 310(0)) to the $0^{th}$ physical page and the $1^{st}$ physical page of the physical block 310(D+1) (as shown in FIG. 7) and writes the new data into the $2^{nd}$-$4^{th}$ physical pages of the physical block 310(D+1) (as shown in FIG. 8). Herein the memory management circuit 202 has completed the data writing operation. Because the valid data in the physical block 310(0) may become invalid during a next operation (for example, a write command), instantly moving all the valid data in the physical block 310(0) to the physical block 310(D+1) may become meaningless. In addition, because data has to be sequentially written into the physical pages of a physical block, the memory management circuit 202 only moves the valid data before the physical page for writing data (i.e., data stored in the $0^{th}$ physical page and the $1^{st}$ physical page of the physical block 310(0)) but not the other valid data (i.e., data stored in the $5^{th}$-$K^{th}$ physical pages of the physical block 310(0)).

In the present exemplary embodiment, the operation for maintaining such a temporary relationship (i.e., the physical unit 310(0) and the physical unit 310(D+1)) is referred to as opening mother-child blocks, wherein the original physical block (for example, the physical block 310(0)) is referred to as a mother physical block while the substitute physical block (for example, the physical block 310(D+1)) is referred to as a child physical block.

Figure 9:
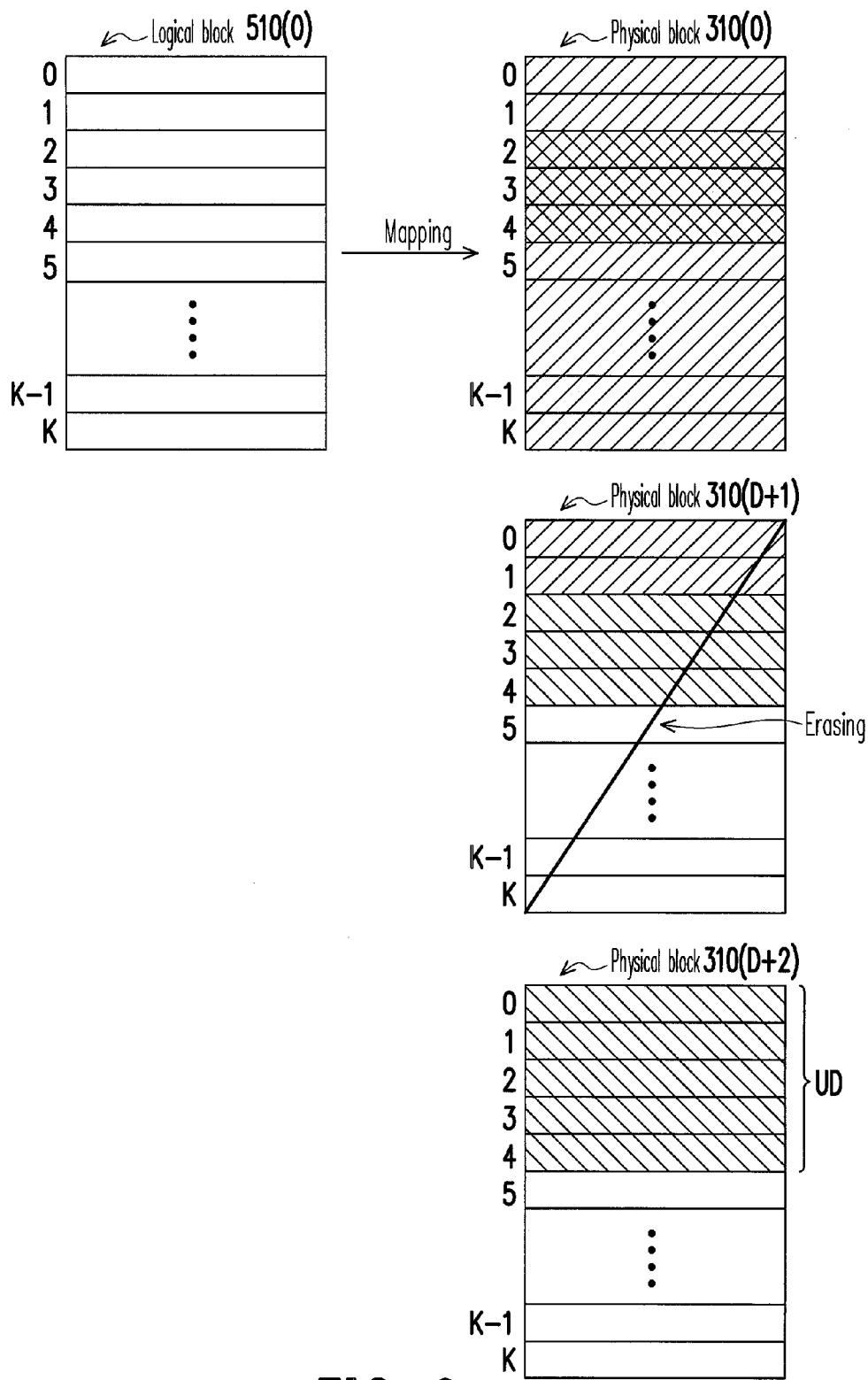
FIG. 9 illustrates an example of writing data into a rewritable non-volatile memory module in a special sequential writing mode according to the first exemplary embodiment of the invention.

Subsequently, the memory management circuit 202 integrates the physical block 310(0) and the physical block 310(D+1) into a single physical block only when the data in the physical block 310(0) and the physical block 310(D+1) needs to be merged, so that the efficiency in using these physical blocks can be improved. Herein the operation for merging the mother-child blocks is referred to as a data merging procedure or closing mother-child blocks. For example, as shown in FIG. 9, while closing the mother-child blocks, the memory management circuit 202 copies the remaining valid data in the physical block 310(0) (i.e., data in the $5^{th}$-$K^{th}$ physical pages of the physical block 310(0)) to the $5^{th}$-$K^{th}$ physical pages of the substitute physical block 310(D+1). Then, the memory management circuit 202 executes an erasing operation on the physical block 310(0) and associates the erased physical block 310(0) to the free area 504. Meanwhile, the memory management circuit 202 associates the physical block 310(D+1) to the data area 502. Namely, the memory management circuit 202 re-maps the logical block 510(0) to the physical block 310(D+1) in the logical block-physical block mapping table. Additionally, in the present exemplary embodiment, the memory management circuit 202 establishes a free area physical block table (not shown) to record the physical blocks that are currently associated to the free area. It should be mentioned that there is a limited number of physical blocks in the free area 504. Accordingly, during the operation of the memory storage apparatus 100, only a limited number of mother-child block sets can be opened. Thus, when the memory storage apparatus 100 receives a write command from the host system 1000, if the number of opened mother-child block sets has reached its upper limit, the memory management circuit 202 needs to close one set of mother-child blocks before it executes the write command.

For example, if the flash memory storage apparatus is a SD card, the maximum number of open mother-child block sets is usually set to 1. For example, when it is in the situation illustrated in FIG. 8 and the memory controller 104 receives a write command from the host system 1000 therefore is about to write data into a logical access address belonging to the logical block 510(1), the memory management circuit 202 has to close the mother-child blocks first (as shown in FIG. 8) and then selects a physical block from the free area 504 to open the mother-child blocks (as shown in FIGS. 6-7) and write the data.

In the present exemplary embodiment, besides the regular sequential writing mode described above, the memory management circuit 202 of the memory controller 104 further writes data by using a special sequential writing mode.

To be specific, because the programming specification of the rewritable non-volatile memory module 106 requests data to be written from the start physical page (i.e., the $0^{th}$ physical page) to the last physical page of each physical block and each bit to be programmed only once (i.e., from "1" to "0"), once data is written into the physical pages of a physical block, another physical block has to be selected from the free area 504 to carry out the operations illustrated in FIG. 8, FIG. 6, and FIG. 7 if the data needs to be updated. In the present exemplary embodiment, when data corresponding to a plurality of continuous logical pages is already written into a child physical block and the host system 1000 wants to update these continuous logical pages, the memory management circuit 202 does not execute aforementioned regular sequential writing mode but instead, execute a special sequential writing mode. To be specific, in the special sequential writing mode, the memory management circuit 202 of the memory controller 104 does not close the mother-child blocks to merge data. Instead, it selects another physical block from the free area 504 as a new child physical block for writing one or more update data belonging to the continuous logical pages.

FIG. 9 illustrates an example of writing data into a rewritable non-volatile memory module in the special sequential writing mode according to the first exemplary embodiment of the invention, wherein the example shows that the special sequential writing mode is used for writing data when the update data pages of a new child physical block are the same as the data pages of an old child physical block.

Referring to FIG. 9, when the rewritable non-volatile memory module 106 is in a storage status illustrated in FIG. 7 and the memory controller 104 receives a write command from the host system 1000 therefore is about to write the update data UD into the $0^{th}$-$4^{th}$ logical pages of the logical block 510(0), the memory management circuit 202 selects a blank physical block (for example, the physical block 310(D+2)) from the free area 504, writes the update data UD into the $0^{th}$-$4^{th}$ physical pages of the physical block 310(D+2), serves the physical block 310(D+2) as a child physical block corresponding to the physical block 310(0), and executes an erasing operation on the physical block 310(D+1).

Figure 10:
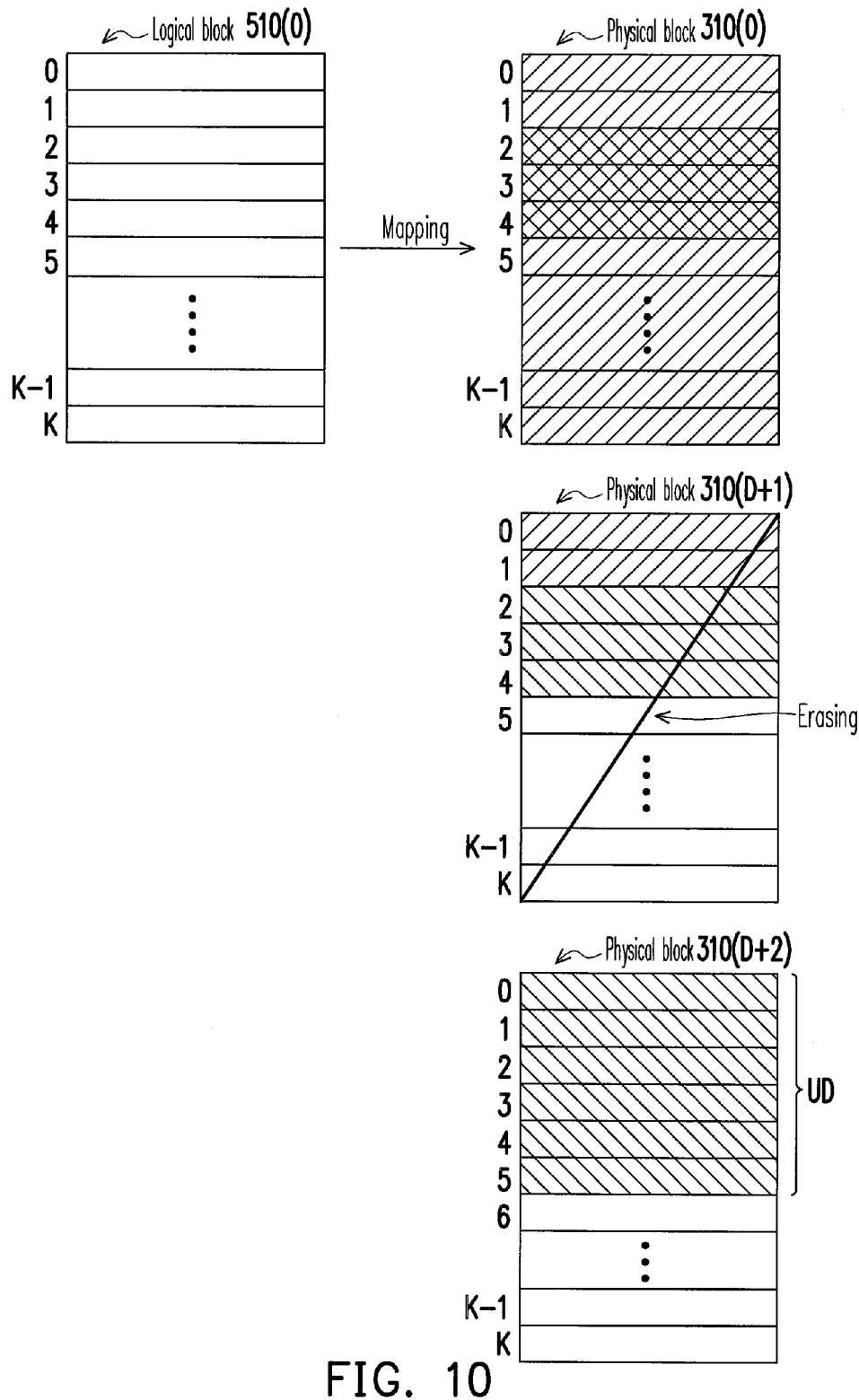
FIG. 10 illustrates another example of writing data into a rewritable non-volatile memory module in the special sequential writing mode according to the first exemplary embodiment of the invention.

FIG. 10 illustrates another example of writing data into a rewritable non-volatile memory module in the special sequential writing mode according to the first exemplary embodiment of the invention, wherein the example shows that the special sequential writing mode is used for writing data when the update data pages of a new child physical block are the same as the data pages of an old child physical block.

Referring to FIG. 10, when the rewritable non-volatile memory module 106 is in a storage status illustrated in FIG. 7 and the memory controller 104 receives a write command from the host system 1000 therefore is about to write the update data UD into the $0^{th}$-$5^{th}$ logical pages of the logical block 510(0), the memory management circuit 202 selects a blank physical block (for example, the physical block 310(D+2)) from the free area 504, writes the update data UD into the $0^{th}$-$5^{th}$ physical pages of the physical block 310(D+2), serves the physical block 310(D+2) as a child physical block corresponding to the physical block 310(0), and executes an erasing operation on the physical block 310(D+1).

Figure 11:
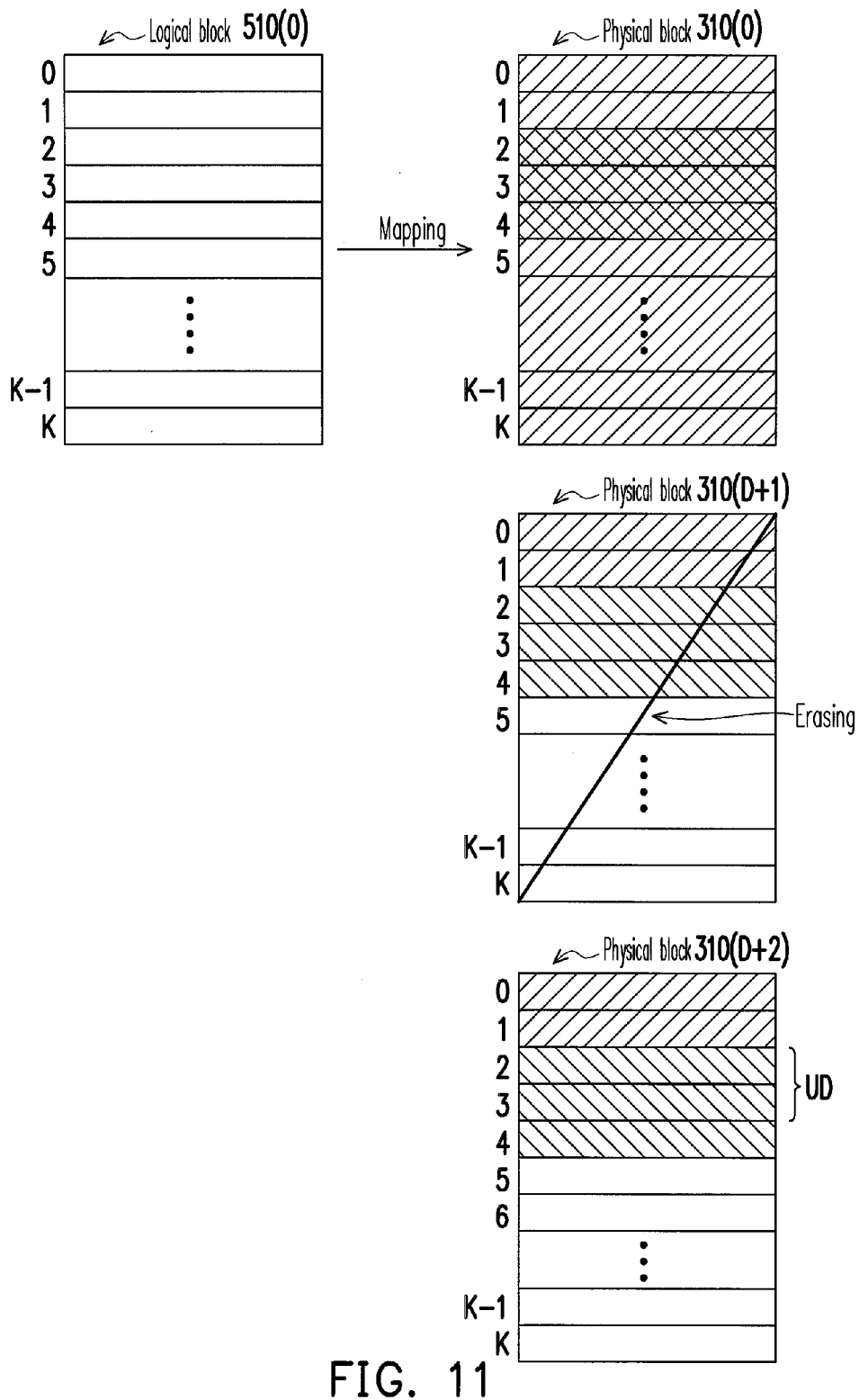
FIG. 11 illustrates yet another example of writing data into a rewritable non-volatile memory module in the special sequential writing mode according to the first exemplary embodiment of the invention.

FIG. 11 illustrates yet another example of writing data into a rewritable non-volatile memory module in the special sequential writing mode according to the first exemplary embodiment of the invention, wherein the example shows that the special sequential writing mode is used for writing data when the update data pages of a new child physical block are the same as the data pages of an old child physical block.

Referring to FIG. 11, when the rewritable non-volatile memory module 106 is in a storage status illustrated in FIG. 7 and the memory controller 104 receives a write command from the host system 1000 therefore is about to write an update data UD into the $2^{nd}$-$3^{rd}$ logical pages of the logical block 510(0), the memory management circuit 202 selects a blank physical block (for example, the physical block 310(D+2)) from the free area 504, copies valid data in the $0^{th}$-$1^{st}$ physical pages of the physical block 310(D+1) to the physical block 310(D+2), writes the update data UD into the $2^{nd}$-$3^{rd}$ physical pages of the physical block 310(D+2), copies valid data in the $4^{th}$ physical page of the physical block 310(D+1) to the physical block 310(D+2), serves the physical block 310(D+2) as a child physical block corresponding to the physical block 310(0), and executes an erasing operation on the physical block 310(D+1).

Thereby, in the present exemplary embodiment, when the host system 1000 is about to write update data into a plurality of continuous logical pages of a logical block and the child physical block corresponding to the physical block that is mapped to the logical block already stores data corresponding to the continuous logical pages, the memory management circuit 202 selects another physical block from the free area 504 as a new child physical block for storing valid data (as shown in FIGS. 9-11) instead of performing a data merging operation (i.e., an operation for closing mother-child blocks), so as to reduce the number of operation for merging data and shorten the time for executing write commands.

Figure 12:
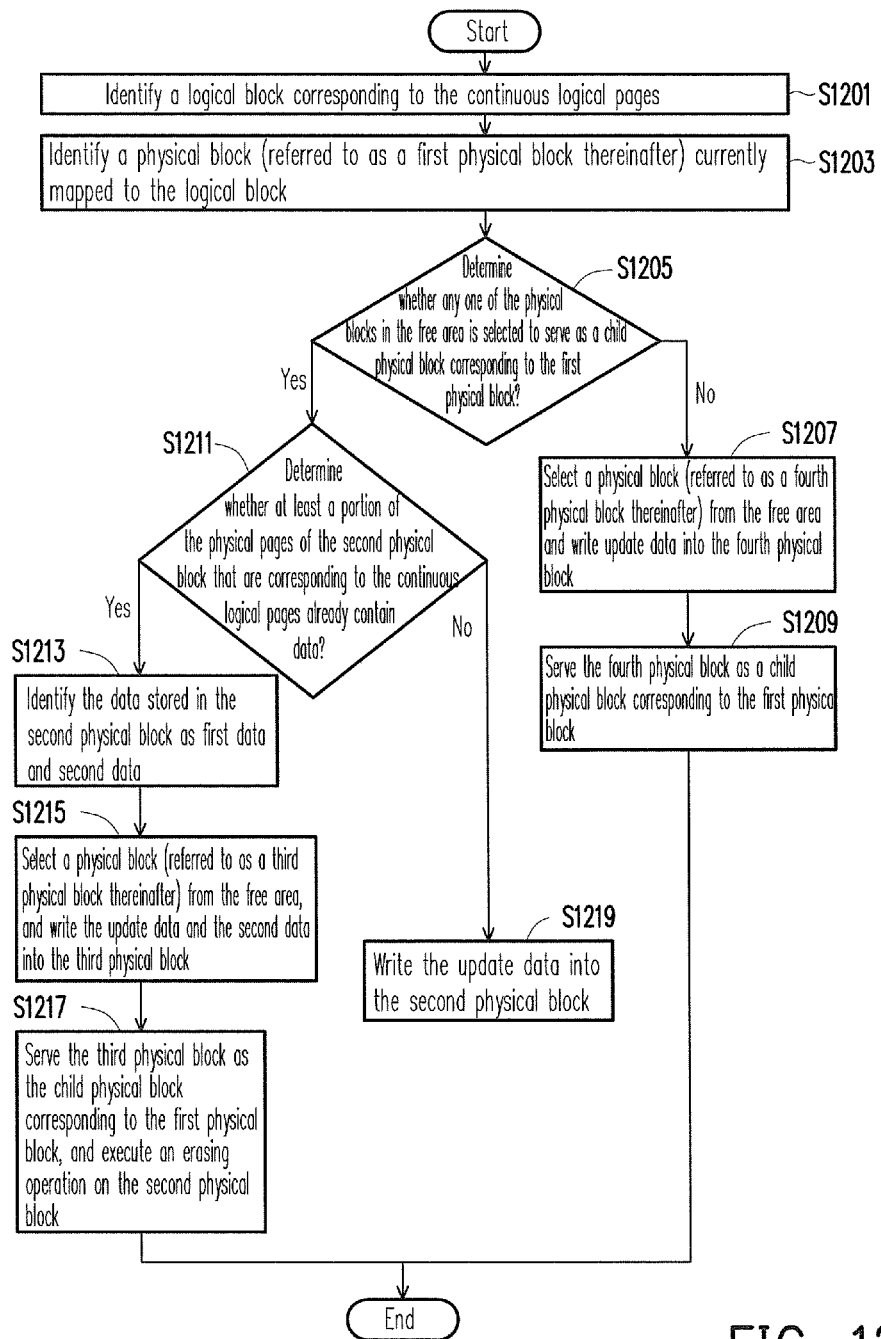
FIG. 12 is a flowchart of a data writing method according to the first exemplary embodiment of the invention.

FIG. 12 is a flowchart of a data writing method according to the first exemplary embodiment of the invention.

Referring to FIG. 12, when update data to be written into a plurality of continuous logical pages is received from the host system 1000, in step S1201, the memory management circuit 202 identifies the logical block corresponding to the continuous logical pages.

Then, in step S1203, the memory management circuit 202 identifies a physical block (referred to as a first physical block thereinafter) currently mapped to the logical block. In step S1205, the memory management circuit 202 determines whether any one of the physical blocks in the free area 504 is selected to serve as a child physical block corresponding to the first physical block.

If none of the physical blocks in the free area 504 is selected to serve as the child physical block corresponding to the first physical block, in step S1207, the memory management circuit 202 selects a physical block (referred to as a fourth physical block thereinafter) from the free area 504 and writes the update data into the fourth physical block. To be specific, the memory management circuit 202 writes the update data into a corresponding physical page of the fourth physical block according to the sequence of the physical pages. In particular, when the physical page into which the update data is written is not the start physical page, the memory management circuit 202 copies valid data in the physical pages before the physical page for writing data from the first physical block to the fourth physical block (as shown in FIGS. 6-8). Next, in step S1209, the memory management circuit 202 serves the fourth physical block as the child physical block corresponding to the first physical block.

If a physical block (referred to as a second physical block thereinafter) is already selected from the free area 504 to serve as the child physical block corresponding to the first physical block, in step S1211, the memory management circuit 202 determines whether at least a portion of the physical pages of the second physical block that are corresponding to the continuous logical pages already store data.

If at least a portion of the physical pages of the second physical block that are corresponding to the continuous logical pages already store data, in step S1213, the memory management circuit 202 identifies the data stored in the second physical block as first data and second data. Herein the first data refers to data stored in the physical pages of the second physical block that are corresponding to the continuous logical pages (for example, data in the $2^{nd}$ and $3^{rd}$ physical pages of the physical block 310(D+1), as illustrated in FIG. 11), and the second data refers to data stored in the physical pages of the second physical block that are not corresponding to the continuous logical pages (for example, data in the $0^{th}$, $1^{st}$, and $4^{th}$ physical pages of the physical block 310(D+1), as illustrated in FIG. 11).

Thereafter, in step S1215, the memory management circuit 202 selects a physical block (referred to as a third physical block thereinafter) from the free area 504 and writes the update data and the second data into the third physical block. To be specific, the update data and the second data are sequentially written into the third physical block according to the corresponding physical pages.

Next, in step S1217, the memory management circuit 202 serves the third physical block as the child physical block corresponding to the first physical block and executes an erasing operation on the second physical block. Herein the steps S1213, S1215, and S1217 are referred to as a second writing procedure.

If at least a portion of the physical pages of the second physical block that are corresponding to the continuous logical pages do not store data, in step S1219, the memory management circuit 202 writes the update data into the second physical block. Similarly, the memory management circuit 202 copies valid data in the physical pages before the physical page for writing data from the first physical block to the second physical block.

Second Exemplary Embodiment

The memory storage apparatus and the host system in the second exemplary embodiment of the invention are substantially the same as the memory storage apparatus and the host system in the first exemplary embodiment, and the difference between the two exemplary embodiments is that in the second exemplary embodiment, the memory controller only writes data in the special sequential writing mode on a specific condition. Below, the second exemplary embodiment will be described with reference to FIG. 1A, FIG. 2, and FIG. 3.

In the second exemplary embodiment, the memory management circuit 202 of the memory controller 104 manages the rewritable non-volatile memory module 106 by using a memory management technique same as that in the first exemplary embodiment (as shown in FIG. 4 and FIG. 5). In addition, the memory management circuit 202 identifies a portion of the physical pages of each physical block as a special page area. In particular, when data corresponding to a plurality of continuous logical pages has been written into the child physical block and the host system 1000 updates the continuous logical pages again, the memory management circuit 202 writes the update data in the regular sequential writing mode or the special sequential writing mode according to whether the physical page for writing the update data belongs to the special page area. For example, when the physical page for writing the update data belongs to the special page area, the memory management circuit 202 writes the update data in the special sequential writing mode. Otherwise, the memory management circuit 202 writes the update data in the regular sequential writing mode.

Figure 13:
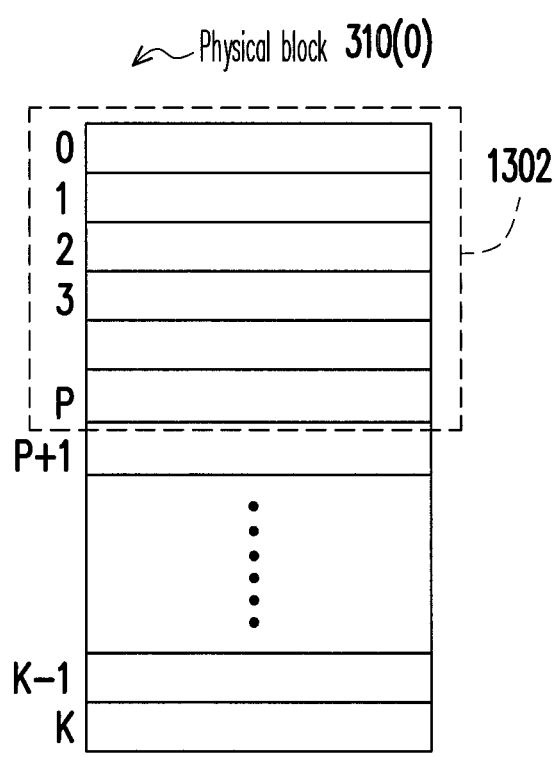
FIG. 13 is a diagram of dividing physical pages of a physical block according to a second exemplary embodiment of the invention.

FIG. 13 is a diagram of dividing physical pages of a physical block according to the second exemplary embodiment of the invention.

Referring to FIG. 13, taking the physical block 310(0) as an example, the memory management circuit 202 sequentially sets the $0^{th}$ to the $P^{th}$ physical pages as being in a special page area 1302 by starting from the start physical page (i.e., the $0^{th}$ physical page). In the present exemplary embodiment, P=K/2. However, the invention is not limited thereto. To be specific, because the special page area is the first several physical pages in a physical block and data has to be sequentially written into the physical pages, when the host system 1000 repeatedly updates data in the special page area, the number of operations for merging data can be effectively reduced by using aforementioned special sequential writing mode. When the host system 1000 repeatedly update data not in the special page area, the regular sequential writing mode may be more efficient since shorter time is required for merging data.

Figure 14:
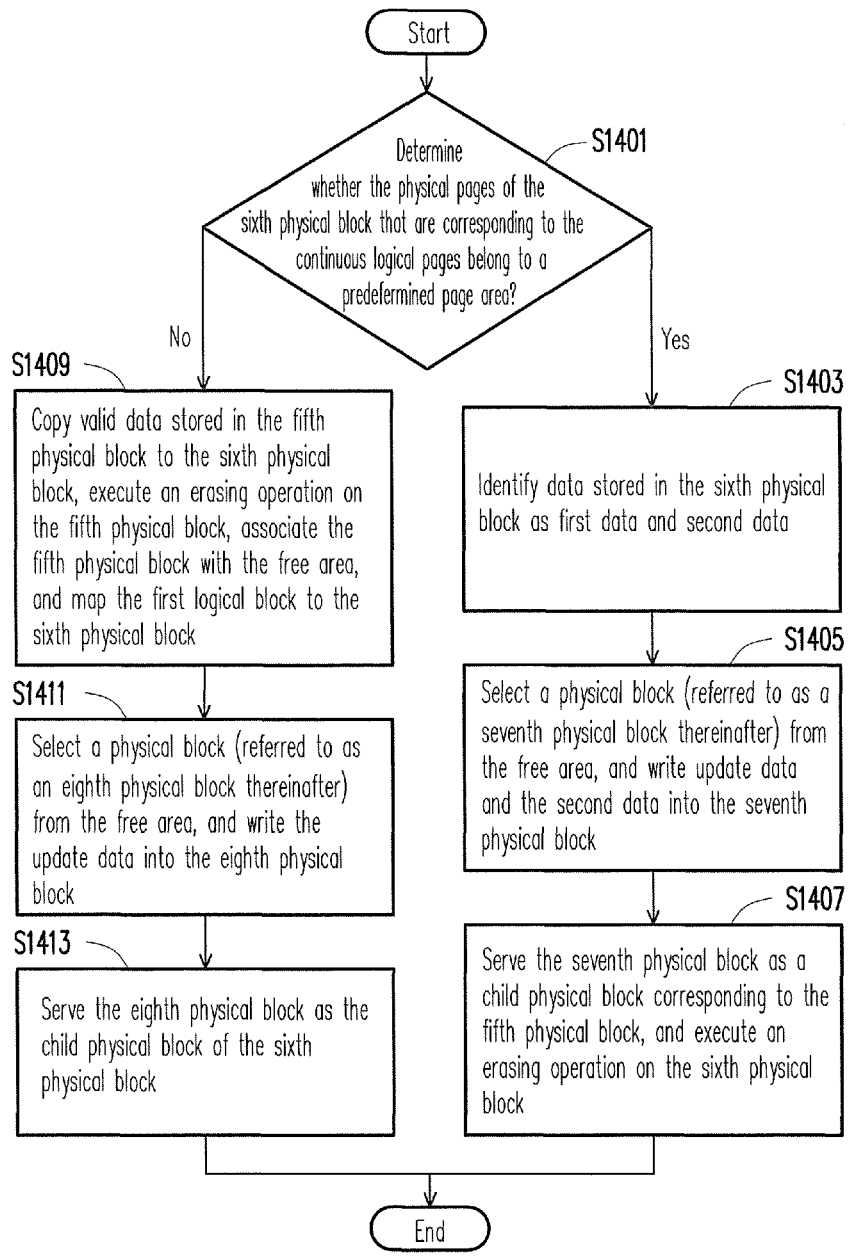
FIG. 14 is a flowchart of a data writing method according to the second exemplary embodiment of the invention.

FIG. 14 is a flowchart of a data writing method according to the second exemplary embodiment of the invention. Herein it is assumed that data corresponding to a plurality of continuous logical pages has been written into a child physical block (referred to as a sixth physical block thereinafter) and the host system 1000 stores update data into the continuous logical pages again, wherein the continuous logical pages belong to the same logical block (referred to as a first logical block thereinafter) and the first logical block is mapped to a physical block (referred to as a fifth physical block thereinafter) in the data area 502.

Referring to FIG. 14, in step S1401, the memory management circuit 202 determines whether physical pages corresponding to the continuous logical pages in the sixth physical block belong to a predetermined page area.

If the physical pages corresponding to the continuous logical pages in the sixth physical block belong to the predetermined page area, in step S1403, the memory management circuit 202 identifies the data stored in the sixth physical block as first data and second data. Same as that in the first exemplary embodiment, the first data refers to data stored in the physical pages of the second physical block that are corresponding to the continuous logical pages, and the second data refers to data stored in the physical pages of the second physical block that are not corresponding to the continuous logical pages.

Then, in step S1405, the memory management circuit 202 selects a physical block (referred to as a seventh physical block thereinafter) from the free area 504 and writes the update data and the second data into the seventh physical block. To be specific, the update data and the second data are sequentially written into the seventh physical block according to their corresponding physical pages.

Next, in step S1407, the memory management circuit 202 serves the seventh physical block as the child physical block corresponding to the fifth physical block and executes an erasing operation on the sixth physical block. Foregoing steps S1403, S1405, and S1407 are referred to as a second writing procedure.

If the physical pages of the sixth physical block that are corresponding to the continuous logical pages do not belong to the predetermined page area, in step S1409, the memory management circuit 202 copies the valid data stored in the fifth physical block to the sixth physical block, executes an erasing operation on the fifth physical block, associates the fifth physical block with the free area 504, and maps the first logical block to the sixth physical block.

Next, in step S1411, the memory management circuit 202 selects a physical block (referred to as an eighth physical block thereinafter) from the free area 504 and writes the update data into the eighth physical block. For example, in the present exemplary embodiment, the memory management circuit 202 sequentially writes the update data into the corresponding physical page of the eighth physical block according to the arrangement of the physical pages. In particular, when the physical page for writing the update data is not the start physical page, the memory management circuit 202 first copies the valid data in the physical pages before the physical page for writing data from the sixth physical block to the eighth physical block (as shown in FIGS. 6-8).

Besides writing the update data into the corresponding physical page of the eighth physical block, in another exemplary embodiment of the invention, the memory management circuit 202 may also directly writes the update data by starting from the start physical page of the eighth physical block and record an offset to identify the mapping relationship between logical pages and physical pages in the eighth physical block. For example, the memory management circuit 202 writes the data to be written into the $3^{rd}$ and the $4^{th}$ logical pages into the $0^{th}$ and the $1^{st}$ physical pages and records an offset, which is 3, to indicate that the data in the $0^{th}$ and the $1^{st}$ physical page is respectively corresponding to the $3^{rd}$ and the $4^{th}$ logical page.

Thereafter, in step S1413, the memory management circuit 202 serves the eighth physical block as the child physical block corresponding to the sixth physical block. Foregoing steps S1409, S1411, and S1413 are referred to as a first writing procedure.

In summary, exemplary embodiments of the invention provide a data writing method, a memory controller, and a memory storage system, wherein the number of operations for merging data is reduced when a host system repeatedly stores update data into the same continuous logical pages, so that the data writing speed is increased. The previously described exemplary embodiments of the present invention have the advantages aforementioned, wherein the advantages aforementioned not required in all versions of the invention.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A data writing method for writing data into a rewritable non-volatile memory module, wherein the rewritable non-volatile memory module has a plurality of physical blocks, and each of the physical blocks has a plurality of physical pages arranged in a sequence, the data writing method comprising:

grouping the physical blocks into at least a data area and a free area;

configuring a plurality of logical blocks for mapping to the physical blocks of the data area, wherein each of the logical blocks has a plurality of logical pages;

receiving a plurality of update data, wherein the update data is corresponding to a plurality of continuous logical pages among the logical pages, the continuous logical pages belong to a first logical block among the logical blocks, and the first logical block is mapped to a first physical block among the physical blocks;

determining whether any one of the physical blocks in the free area is selected to serve as a child physical block corresponding to the first physical block;

when a second physical block among the physical blocks in the free area is selected and moved from the free area to serve as the child physical block corresponding to the first physical block, determining whether at least a portion of the physical pages of the second physical block that are corresponding to the continuous logical pages already store data; and when at least a portion of the physical pages of the second physical block that are corresponding to the continuous logical pages already store data, executing a second writing procedure, wherein the second writing procedure comprises:

identifying data stored in the second physical block as first data and second data;

selecting a third physical block from the physical blocks of the free area;

writing the update data and the second data into the third physical block;

serving the third physical block as the child physical block corresponding to the first physical block; and executing an erasing operation on the second physical block, wherein the first data is data stored in the physical pages of the second physical block that are corresponding to the continuous logical pages, and the second data is data stored in the physical pages of the second physical block that are not corresponding to the continuous logical pages.

2. The data writing method according to claim 1 further comprising:

when the physical pages of the second physical block that are corresponding to the continuous logical pages do not store data, writing the update data into the physical pages of the second physical block that are corresponding to the continuous logical pages.

3. The data writing method according to claim 2 further comprising:

before writing the update data into the physical pages of the second physical block that are corresponding to the continuous logical pages, copying valid data in the first physical block to the second physical block.

4. The data writing method according to claim 1 further comprising:

when none of the physical blocks in the free area is selected to serve as the child physical block corresponding to the first physical block, selecting a fourth physical block from the physical blocks of the free area, writing the update data into the fourth physical block, and serving the fourth physical block as the child physical block corresponding to the first physical block.

5. A data writing method for writing a plurality of update data into a rewritable non-volatile memory module, wherein the rewritable non-volatile memory module has a plurality of physical blocks, each of the physical blocks has a plurality of physical pages arranged in a sequence, the physical blocks are grouped into a data area and a free area, a plurality of logical blocks is configured for mapping to the physical blocks of the data area, each of the logical blocks is mapped to one of the physical blocks in the data area and has a plurality of logical pages, a fifth physical block among the physical blocks of the data area is mapped to a first logical block among the logical blocks, a sixth physical block is selected from the physical blocks of the free area to serve as a child physical block corresponding to the fifth physical block, the update data belongs to a plurality of continuous logical pages among the logical pages of the first logical block, and at least a portion of the physical pages of the sixth physical block that are corresponding to the continuous logical pages already store data, the data writing method comprising:

determining whether the physical pages of the sixth physical block that are corresponding to the continuous logical pages belong to a predetermined page area; and when the physical pages of the sixth physical block that are corresponding to the continuous logical pages belong to the predetermined page area, executing a second writing procedure, wherein the second writing procedure comprises:

identifying data stored in the sixth physical block as first data and second data;

selecting a seventh physical block from the physical blocks of the free area and removed the seventh physical block from the free area;

writing the update data and the second data into the seventh physical block;

serving the seventh physical block as the child physical block corresponding to the fifth physical block; and executing an erasing operation on the sixth physical block, wherein the first data is data stored in the physical pages of the sixth physical block that are corresponding to the continuous logical pages, and the second data is data stored in the physical pages of the sixth physical block that are not corresponding to the continuous logical pages, wherein the predetermined page area is a plurality of continuous physical pages containing a start physical page in each of the physical blocks.

6. The data writing method according to claim 5 further comprising:

when the physical pages of the sixth physical block that are corresponding to the continuous logical pages do not belong to the predetermined page area, executing a first writing procedure, wherein the first writing procedure comprises:

copying valid data in the fifth physical block to the sixth physical block;

executing the erasing operation on the fifth physical block;

associating the fifth physical block with the free area;

mapping the first logical block to the sixth physical block;

selecting an eighth physical block from the physical blocks of the free area;

writing the update data into the eighth physical block; and serving the eighth physical block as a child physical block corresponding to the sixth physical block.

7. The data writing method according to claim 6, wherein the step of writing the update data into the eighth physical block comprises:

writing the update data by starting from a start physical page among the physical pages of the eighth physical block.

8. The data writing method according to claim 6, wherein the step of writing the update data into the eighth physical block comprises:

copying a part of valid data in the sixth physical block to the eighth physical block; and writing the update data into the physical pages of the eighth physical block that are corresponding to the continuous logical pages.

9. A data writing method for writing data into a rewritable non-volatile memory module, wherein the rewritable non-volatile memory module has a plurality of physical blocks, and each of the physical blocks has a plurality of physical pages arranged in a sequence, the data writing method comprising:

grouping the physical blocks into at least a data area and a free area;

configuring a plurality of logical blocks for mapping to the physical blocks in the data area, wherein each of the logical blocks has a plurality of logical pages;

receiving at least one update data, wherein the update data is corresponding to at least one logical page among the logical pages, the at least one logical page belongs to a first logical block among the logical blocks, and the first logical block is mapped to a first physical block among the physical blocks;

determining whether any one of the physical blocks in the free area is selected to serve as a child physical block corresponding to the first physical block;

when a second physical block among the physical blocks in the free area is selected and moved from the free area to serve as the child physical block corresponding to the first physical block, determining whether at least one physical page of the second physical block that is corresponding to the at least one logical page already stores data; and when the at least one physical page of the second physical block that is corresponding to the at least one logical page already stores data, executing a second writing procedure, wherein the second writing procedure comprises:

selecting a third physical block from the physical blocks of the free area;

writing the update data into the third physical block;

serving the third physical block as the child physical block corresponding to the first physical block; and executing an erasing operation on the second physical block.

10. The data writing method according to claim 9, wherein when the second physical block has first data corresponding to the at least one logical page and second data not corresponding to the at least one logical page, the second writing procedure further comprises writing the second data into the third physical block.

11. The data writing method according to claim 9 further comprising determining whether the at least one physical page of the second physical block that is corresponding to the at least one logical page is in a predetermined page area before executing the second writing procedure and executing the second writing procedure only when the at least one physical page is in the predetermined page area.

12. A memory controller for managing a rewritable non-volatile memory module, wherein the rewritable non-volatile memory module has a plurality of physical blocks, and each of the physical blocks has a plurality of physical pages arranged in a sequence, the memory controller comprising:

a host interface, configured to couple to a host system;

a memory interface, configured to couple to the rewritable non-volatile memory module; and a memory management circuit, coupled to the host interface and the memory interface, wherein the memory management circuit groups the physical blocks into at least a data area and a free area and configures a plurality of logical blocks for mapping to the physical blocks of the data area, wherein each of the logical blocks has a plurality of logical pages, wherein the memory management circuit receives a plurality of update data from the host system, wherein the update data belongs to a plurality of continuous logical pages among the logical pages, the continuous logical pages belong to a first logical block among the logical blocks, and the first logical block is mapped to a first physical block among the physical blocks, wherein the memory management circuit determines whether any one of the physical blocks in the free area is selected to serve as a child physical block corresponding to the first physical block, wherein when a second physical block among the physical blocks in the free area is selected and moved from the free area to serve as the child physical block corresponding to the first physical block, the memory management circuit determines whether at least a portion of the physical pages of the second physical block that are corresponding to the continuous logical pages already store data, wherein when at least a portion of the physical pages of the second physical block that are corresponding to the continuous logical pages already store data, the memory management circuit identifies data stored in the second physical block as first data and second data, selects a third physical block from the physical blocks of the free area, writes the update data and the second data into the third physical block, serves the third physical block as the child physical block corresponding to the first physical block, and executes an erasing operation on the second physical block, wherein the first data is data stored in the physical pages of the second physical block that are corresponding to the continuous logical pages, and the second data is data stored in the physical pages of the second physical block that are not corresponding to the continuous logical pages.

13. The memory controller according to claim 12, wherein when the physical pages of the second physical block that are corresponding to the continuous logical pages do not store data, the memory management circuit writes the update data into the physical pages of the second physical block that are corresponding to the continuous logical pages.

14. The memory controller according to claim 13, wherein before writing the update data into the physical pages of the second physical block that are corresponding to the continuous logical pages, the memory management circuit copies valid data in the first physical block to the second physical block.

15. The memory controller according to claim 14, wherein when none of the physical blocks in the free area is selected to serve as the child physical block corresponding to the first physical block, the memory management circuit selects a fourth physical block from the physical blocks of the free area, writes the update data into the fourth physical block, and serves the fourth physical block as the child physical block corresponding to the first physical block.

16. The memory controller according to claim 12, wherein when at least a portion of the physical pages of the second physical block that are corresponding to the continuous logical pages already store data, the memory management circuit further determines whether the physical pages of the second physical block that are corresponding to the continuous logical pages belong to a predetermined page area, wherein only when the physical pages of the second physical block that are corresponding to the continuous logical pages belong to the predetermined page area, the memory management circuit identifies the data stored in the second physical block as the first data and the second data, selects the third physical block from the physical blocks of the free area, writes the update data and the second data into the third physical block, serves the third physical block as the child physical block corresponding to the first physical block, and executes the erasing operation on the second physical block.

17. A memory storage apparatus, comprising:

a connector, configured to couple to a host system;

a rewritable non-volatile memory module, having a plurality of physical blocks, wherein each of the physical blocks has a plurality of physical pages arranged in a sequence; and a memory controller, coupled to the connector and the rewritable non-volatile memory module, wherein the memory controller groups the physical blocks into at least a data area and a free area and configures a plurality of logical blocks for mapping to the physical blocks of the data area, wherein each of the logical blocks has a plurality of logical pages, wherein the memory controller receives a plurality of update data from the host system, wherein the update data belongs to a plurality of continuous logical pages among the logical pages, the continuous logical pages belong to a first logical block among the logical blocks, and the first logical block is mapped to a first physical block among the physical blocks, wherein the memory controller determines whether any one of the physical blocks in the free area is selected to serve as a child physical block corresponding to the first physical block, wherein when a second physical block among the physical blocks in the free area is selected and moved from the free area to serve as the child physical block corresponding to the first physical block, the memory controller determines whether at least a portion of the physical pages of the second physical block that are corresponding to the continuous logical pages already store data, wherein when at least a portion of the physical pages of the second physical block that are corresponding to the continuous logical pages already store data, the memory controller identifies data stored in the second physical block into first data and second data, selects a third physical block from the physical blocks of the free area, writes the update data and the second data into the third physical block, serves the third physical block as the child physical block corresponding to the first physical block, and executes an erasing operation on the second physical block, wherein the first data is data stored in the physical pages of the second physical block that are corresponding to the continuous logical pages, and the second data is data stored in the physical pages of the second physical block that are not corresponding to the continuous logical pages.

18. The memory storage apparatus according to claim 17, wherein when the physical pages of the second physical block that are corresponding to the continuous logical pages do not store data, the memory controller writes the update data into the physical pages of the second physical block that are corresponding to the continuous logical pages.

19. The memory storage apparatus according to claim 18, wherein before writing the update data into the physical pages of the second physical block that are corresponding to the continuous logical pages, the memory controller copies valid data in the first physical block to the second physical block.

20. The memory storage apparatus according to claim 17, wherein when none of the physical blocks in the free area is selected to serve as the child physical block corresponding to the first physical block, the memory controller selects a fourth physical block from the physical blocks of the free area, writes the update data into the fourth physical block, and serves the fourth physical block as the child physical block corresponding to the first physical block.

21. The memory storage apparatus according to claim 17, wherein when at least a portion of the physical pages of the second physical block that are corresponding to the continuous logical pages already store data, the memory controller further determines whether the physical pages of the second physical block that are corresponding to the continuous logical pages belong to a predetermined page area, wherein only when the physical pages of the second physical block that are corresponding to the continuous logical pages belong to the predetermined page area, the memory controller identifies the data stored in the second physical block into the first data and the second data, selects the third physical block among the physical blocks in the free area, writes the update data and the second data into the third physical block, serves the third physical block as the child physical block corresponding to the first physical block, and executes the erasing operation on the second physical block.

* * * * *